(12) United States Patent
Lucchese et al.

(10) Patent No.: US 11,441,711 B2
(45) Date of Patent: Sep. 13, 2022

(54) CONNECTION DEVICE FOR JOINING TWO PIPE SECTIONS

(71) Applicant: SAIPEM S.p.A., San Donato Milanese (IT)

(72) Inventors: Francesco Lucchese, San Donato Milanese (IT); Gianluca Toso, San Donato Milanese (IT); Diego Lazzarin, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 127 days.

(21) Appl. No.: 16/652,300

(22) PCT Filed: Oct. 12, 2018

(86) PCT No.: PCT/IB2018/057926
§ 371 (c)(1),
(2) Date: Mar. 30, 2020

(87) PCT Pub. No.: WO2019/073446
PCT Pub. Date: Apr. 18, 2019

(65) Prior Publication Data
US 2020/0240559 A1    Jul. 30, 2020

(30) Foreign Application Priority Data
Oct. 12, 2017   (IT) .................. 102017000115272

(51) Int. Cl.
*F16L 1/26*     (2006.01)
*F16L 27/053*   (2006.01)
(Continued)

(52) U.S. Cl.
CPC ............... *F16L 27/053* (2013.01); *F16L 1/26* (2013.01); *F16L 27/047* (2013.01); *F16L 27/067* (2013.01); *F16L 27/073* (2013.01); *F16L 37/0915* (2016.05)

(58) Field of Classification Search
CPC ... F16L 37/0915; F16L 27/047; F16L 27/073; F16L 1/26; F16L 27/053; F16L 23/04;
(Continued)

(56) References Cited

U.S. PATENT DOCUMENTS 999,564 A * 8/1911 Inghram ............... F16L 27/053
                                                     285/268
1,197,588 A * 9/1916 Austin .................. F16L 27/053
                                                     285/270
(Continued)

FOREIGN PATENT DOCUMENTS

WO    WO 2011/021945    2/2011

OTHER PUBLICATIONS

Notification Concerning Submission, Obtention or Transmittal of Priority Document for International Application No. PCT/IB2018/057926 dated Jan. 22, 2019.
(Continued)

*Primary Examiner* — Zachary T Dragicevich
*Assistant Examiner* — James A Linford
(74) *Attorney, Agent, or Firm* — Neal, Gerber & Eisenberg LLP

(57) ABSTRACT

A connection device for joining two pipe sections in a body of water has a first tubular body having a spherical face; a second tubular body having at least one spherical face; a tubular pusher arranged about the second tubular body and having a spherical face; a first mechanism for coupling the second tubular body between the first tubular body and the tubular pusher and providing a spherical coupling between
(Continued)

the first and the second tubular body; and a second mechanism for blocking any movement about the spherical coupling of the second tubular body with respect to the first tubular body and the tubular pusher.

16 Claims, 5 Drawing Sheets

(51) Int. Cl.
  *F16L 37/091* (2006.01)
  *F16L 27/047* (2006.01)
  *F16L 27/067* (2006.01)
  *F16L 27/073* (2006.01)

(58) Field of Classification Search
  CPC ......... F16L 23/08; F16L 23/12; E21B 43/013; E21B 17/05
  See application file for complete search history.

(56) References Cited

U.S. PATENT DOCUMENTS

| | | |
|---|---|---|
| 1,202,502 A * | 10/1916 | Forth .................... F16L 27/053 285/268 |
| 3,663,043 A | 5/1972 | Walton |
| 4,133,557 A | 1/1979 | Ahlstone |
| 4,180,285 A | 12/1979 | Reneau |
| 4,486,037 A | 12/1984 | Shotbolt |
| 4,696,494 A | 9/1987 | Schmitz et al. |
| 5,368,342 A * | 11/1994 | Latham .................. F16L 27/053 277/626 |
| 6,113,157 A * | 9/2000 | Wilkins ................ E21B 43/013 285/263 |
| 6,419,279 B1 * | 7/2002 | Latham .................. F16L 23/036 285/261 |
| 6,554,324 B1 | 4/2003 | Herman |
| 6,698,800 B2 | 3/2004 | Spiering et al. |
| 8,833,802 B2 | 9/2014 | Morris |
| 9,890,615 B1 * | 2/2018 | Shirani ............... E21B 41/0007 |
| 2010/0200241 A1 | 8/2010 | Ward |

OTHER PUBLICATIONS

International Search Report and Written Opinion for International Application No. PCT/IB2018/057926 dated Jan. 29, 2019.

* cited by examiner

CONNECTION DEVICE FOR JOINING TWO PIPE SECTIONS

PRIORITY CLAIM

This application is a national stage application of PCT/IB2018/057926, filed on Oct. 12, 2018, which claims the benefit of and priority to Italian Patent Application No. 102017000115272, filed on Oct. 12, 2017, the entire contents of which are each incorporated by reference herein.

TECHNICAL FIELD

The present disclosure relates to a connection device for joining two pipe sections. In particular, the present disclosure relates to a connection device for joining two angularly misaligned sections of an underwater pipe, without thereby losing generality.

BACKGROUND

In the oil & gas sector it is sometimes necessary to connect angularly misaligned pipe sections in a body of water even at considerable depth. The connection of the pipe sections must guarantee hydraulic sealing and, at the same time, be relatively strong enough to withstand the different combinations of stresses acting on a pipe section, which could compromise the stability and resistance thereof.

In this sector, PCT Patent Application No. WO 2011/021,945 describes a guided alignment system, consisting of a connector, composed of a fixed part and a movable part coupled to the fixed part, which includes a shaped centering cavity suitable for insertion of the movable part and centering guides that allow the two faces of the connector to be brought within the required tolerances. When required, removable pull pistons can be mounted on recesses to facilitate the approach step. The mechanical connection can be made through inclined or collar jaws. The system described above allows angular misalignments to be corrected up to a maximum of 8° but at least one section of the pipe should be relatively flexible.

Where misalignments are combined with relatively high flexural rigidity, U.S. Pat. No. 6,554,324 and U.S. Published Patent Application No. 2010/200,241 teach how to use more power during the alignment step.

However, the misalignment values correctable with the systems described in these documents are minor. When the angular misalignment between the pipe sections is relatively very high, the spherical coupling connection devices of the type described in U.S. Pat. Nos. 8,833,802, 4,696,494, and 6,698,800 are preferable to connection devices which have flanged connections but do not provide a specific solution designed to solve the combined problem of managing major angular misalignments and providing the connection with high mechanical characteristics.

SUMMARY

The object of the present disclosure is to provide a connection device which mitigates certain of the drawbacks of certain of the prior art.

In accordance with the present disclosure, there is provided a connection device for joining two pipe sections, the connection device comprising:
 a first tubular body having a spherical face;
 a second tubular body having at least one spherical face;
 a tubular pusher arranged about the second tubular body and having a spherical face;
 a first mechanism for coupling the second tubular body between the first tubular body and the tubular pusher and making a spherical coupling between the first and the second tubular body; and
 a second mechanism for blocking any movement about the spherical coupling of the second tubular body with respect to the first tubular body and the tubular pusher.

The present disclosure enables a spherical coupling to be provided between two angularly misaligned pipe sections through a first mechanism and prevents the spherical coupling from acting as a spherical joint through a second mechanism.

In particular, the connection device comprises a vice for radially and axially clamping the first tubular body and the tubular pusher about the second tubular body at the spherical coupling. In this way, the vice applies clamping forces to the three elements defining the spherical coupling and determines a univocal position between the first tubular body and the tubular pusher. Furthermore, the vice enables the release of the force that is initially applied to the spherical coupling by the first mechanism, which has the main function of bringing the first and the second tubular body close together and providing the coupling between the first and the second tubular body.

Advantageously, the vice comprises at least two clamps having respective inner faces that cooperate with annular protrusions of the first tubular body and the tubular pusher for transferring radial and axial forces to the first tubular body and the tubular pusher.

In particular, the vice is supported by the first mechanism so as to be positioned in the exact point around the area where the spherical coupling is provided.

In particular, the first mechanism comprises a first frame integral with the first tubular body and a second frame integral with the tubular pusher and actuators connectable to the first and the second frame to bring the first and the second frame close together and provide the spherical coupling between the first and second tubular bodies and the tubular pusher. In this way, the first and the second frame and the actuators can bring the first and the second tubular body close together and provide the spherical coupling.

In particular, the first and the second frame comprise respective seats for housing actuators and each actuator is provided with two anchoring members configured for selectively being inserted in the respective seats and removed from the respective seats. In this way, the actuators can be coupled to the first and the second frame only if necessary and reused in other connection devices.

In particular, the first and the second frame respectively comprise first and second centering elements so as to substantially align the first tubular body with the tubular pusher.

In particular, the second locking device comprises a plurality of spacers, which are selectively operable between a retracted configuration and an extended configuration, are arranged between the tubular pusher and the second tubular body, and in the extended configuration block possible movements, in particular oscillations, of the second tubular body with respect to the tubular pusher and transfer the bending stresses from the first body to the second tubular body. In this way, a relative rotation between the second tubular body and the first tubular body is prevented even in the presence of bending stresses applied to the second tubular body and/or the second section of the pipe.

From a constructional point of view, each spacer is advantageously slidably mounted through a respective seat formed in the tubular pusher and is movable in the radial direction.

In particular, the connection device comprises a plurality of additional actuators, each being associated with a respective spacer for individually controlling each spacer.

In particular, the first tubular body has a spherical inner face; the second tubular body has a spherical outer face; and the tubular pusher has a spherical inner face; the spherical outer face of the second tubular body and the spherical inner faces of the first tubular body and the tubular pusher being configured to provide a spherical coupling between the first and second tubular bodies and the tubular pusher. In this way, the spherical coupling forms along the spherical faces between the first and second tubular bodies and the tubular pusher.

Alternatively, the first tubular body has a spherical outer face; the second tubular body has a spherical inner face and a spherical outer face; and the tubular pusher has a spherical inner face; the spherical outer face of the tubular body, the spherical inner and outer faces of the tubular body and the spherical inner face of the tubular pusher being configured to provide a spherical coupling between the first and second tubular bodies and the tubular pusher. In this way, four spherical faces need to be provided, but the overall spherical surface is smaller than the overall spherical surface comprising three spherical faces.

In particular, the first tubular body has an annular-shaped inclined outer face and the tubular pusher has an annular-shaped inclined outer face; said inclined outer faces being configured to receive the forces for clamping the spherical coupling. In this way, the vice is capable of transferring radial and axial forces along said inclined outer faces for clamping the spherical coupling.

A further object of the present disclosure is to provide a connection method which mitigates certain of the drawbacks of certain of the prior art.

In accordance with the present disclosure, there is provided a connection method for joining two pipe sections, the connection method comprising the steps of:

arranging a first tubular body having a spherical face in a body of water;

arranging a second tubular body having at least one spherical face in the body of water, facing the first tubular body;

arranging a tubular pusher having a spherical face about the second tubular body;

clamping the second tubular body between the first tubular body and the tubular pusher so as to provide a spherical coupling between the first and second tubular bodies and the tubular pusher; and blocking any movement about the spherical coupling between the second tubular body with respect to the first tubular body and the tubular pusher.

In this way, the spherical coupling is locked by clamping the first tubular body and the tubular pusher around the second tubular body and blocking possible movements of the second tubular body with respect to the tubular pusher.

In particular, the clamping step comprises applying radial and axial forces to the tubular body and the tubular pusher about the second tubular body at the spherical coupling by a vice. In practice, the spherical coupling is locked by the second locking device. The spherical coupling must also ensure hydraulic sealing and for this reason the mutually contacting spherical faces may contain seats in which gaskets are arranged. The blocking of the movements between the second tubular body and the tubular pusher prevents the mutually contacting spherical faces from sliding relative to one another, and therefore the spherical coupling from acting as a spherical joint.

In particular, the first tubular body and the tubular pusher comprise annular protrusions which receive the radial and axial forces applied by a vice. Conveniently, the annular protrusions have respective inclined walls that enable the closing action of the clamp to be transformed into radial forces and axial forces.

In particular, the method comprises coupling a first frame integral with the first tubular body and a second frame integral with the tubular pusher by actuators selectively connectable to the first and the second frame to bring the first and the second frame close together. In this way, the second tubular body, regardless of its angular orientation with respect to the first tubular body, is pushed by the tubular pusher towards the first tubular body to provide the spherical coupling.

In particular, the method comprises centering the first and the second frame in the coupling step so as to align the first tubular body with the tubular pusher. In the step wherein the first and the second frame approach each other, the second tubular body is pushed by the tubular pusher at the spherical outer face and is free to tilt within certain limits with respect to the tubular pusher.

The blocking of the possible movements between the second tubular body and the tubular pusher is implemented only after the clamping of the spherical coupling through the second mechanism. The blocking of said possible movements, in particular oscillations, is achieved by arranging a plurality of operating spacers in an extended configuration between the tubular pusher and the second tubular body. In particular, each spacer is operated by a respective additional actuator between said extended configuration, in which the movement is constrained, and a retracted configuration.

Additional features are described in, and will be apparent from the following Detailed Description and the figures.

BRIEF DESCRIPTION OF THE FIGURES

Further features and advantages of the present disclosure will be apparent from the following description of a non-limiting embodiment thereof, with reference to the figures of the accompanying drawings, wherein.

DETAILED DESCRIPTION

Figure 1:
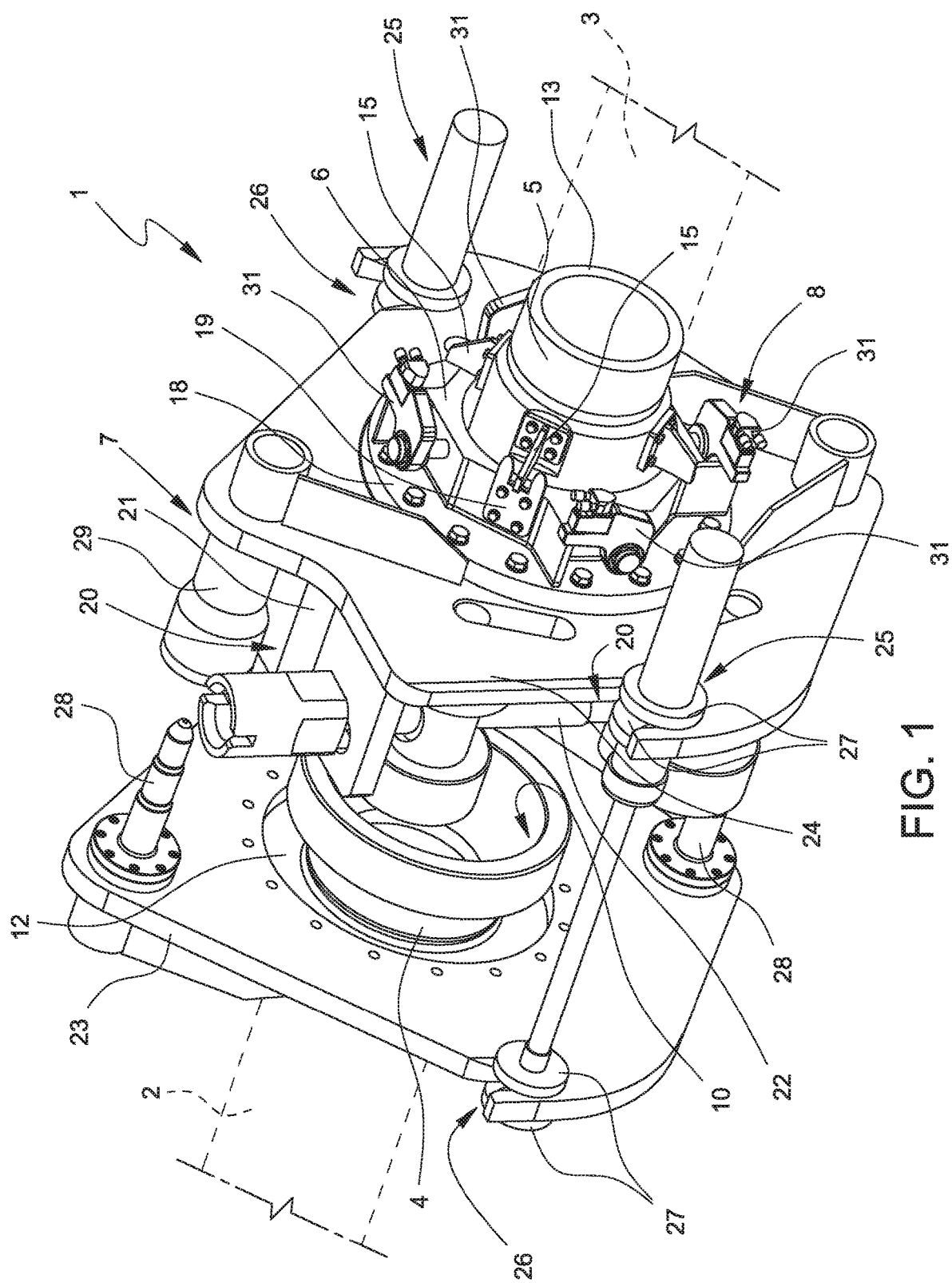
FIG. 1 is a perspective view, with parts removed for clarity, of a connection device constructed in accordance with the present disclosure for joining two angularly misaligned sections of a pipe.

With reference to FIG. 1, a connection device 1 is shown as a whole, which is configured to connect two pipe sections 2 and 3 in a body of water, and controlled from a remote location, possibly with the aid of remotely operated vehicles. In particular, the connection device 1 is remotely controlled by remotely operated vehicles in all the various operating connection steps.

Figure 2:
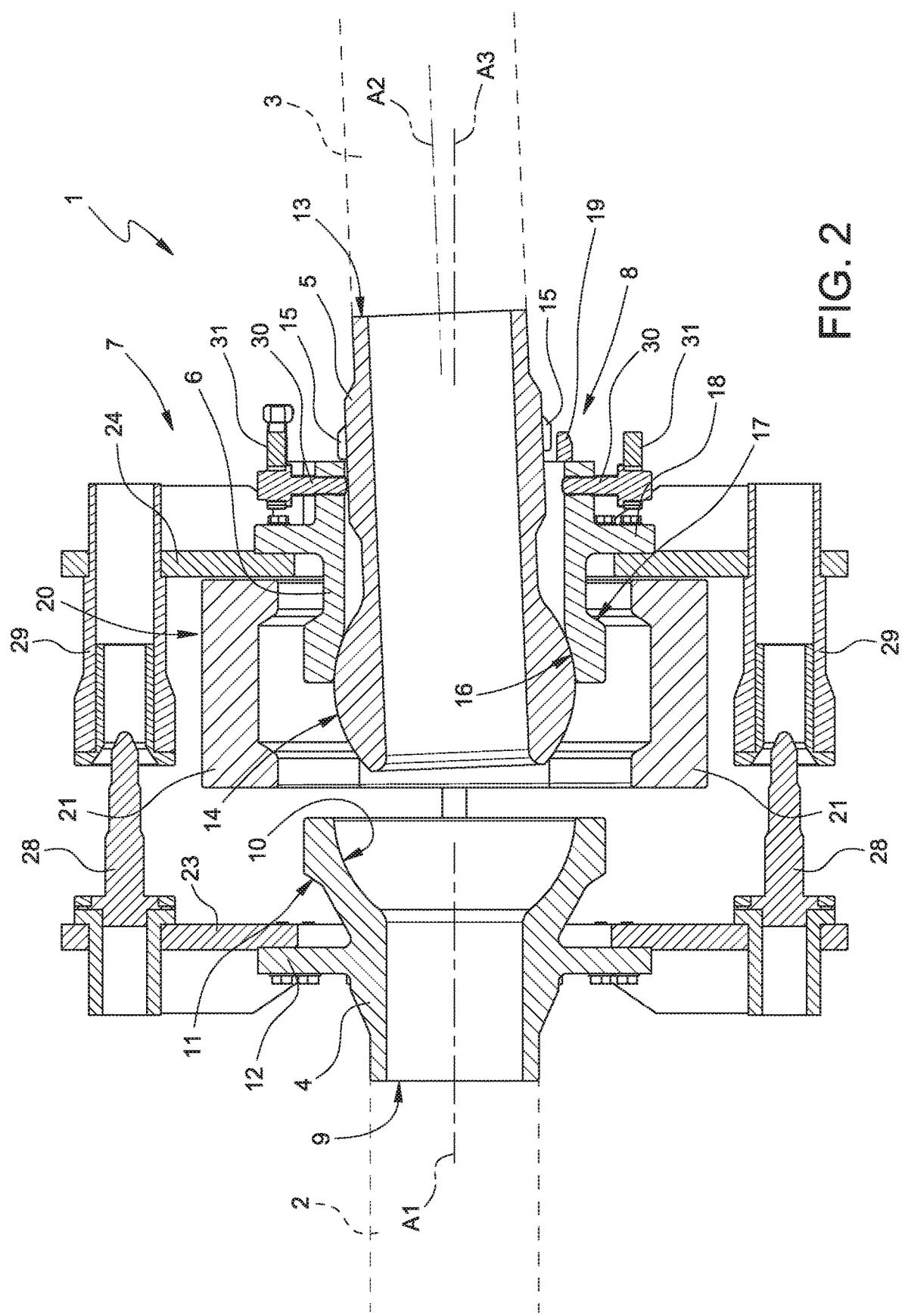
FIGS. 2, 3 and 4 are longitudinal sectional views, with parts removed for clarity, of the connection device in FIG. 1 in respective operating steps of the method object of the present disclosure.

With reference to FIG. 2, the connection device 1 comprises a tubular body 4 configured to be made integral with the first section 2 of the pipe; a second tubular body 5 configured to be made integral with the second section 3 of the pipe; and a tubular pusher 6 arranged around the tubular body 5; a mechanism 7 configured to bring the first and the second tubular body 4 and 5 close together and providing a spherical coupling between the first and the second tubular body 4 and 5; and a mechanism 8 configured to block any movements of the tubular body 5 with respect to the mechanism 7.

In greater detail, the tubular body 4 extends along an axis A1 and comprises one end 9 configured to be jointed, possibly by welding, with the section 2 of the pipe; an annular protrusion at the end opposite the end 9; a spherical inner face 10 at the annular protrusion; an inclined outer face 11 at the annular protrusion; and a flange 12 arranged between the annular protrusion and the end 9 to connect the tubular body 4 to the mechanism 7. The tubular body 5 extends along an axis A2 and comprises one end 13 configured to be connected, possibly by welding, to the section 3 of the pipe; an annular protrusion opposite the end 13; a spherical outer face 14 at the annular protrusion; and a plurality of stop members 15 arranged near the end 13. The tubular pusher 6 extends along an axis A3 and comprises an annular protrusion; a spherical inner face 16 at the annular protrusion; an inclined outer face 17; a flange 18 configured to connect the tubular pusher 6 to the mechanism 7; and stop members 19 suitable to cooperate with the stop members 15. The stop members 15 and 19 prevent relative rotation between the tubular body 5 and the tubular pusher 6, prevent the tubular body 5 from slipping off the tubular pusher 6, and maintain the spherical inner face 16 of the tubular pusher 5 near the spherical outer face 14 of the second tubular body 5.

Figure 4:
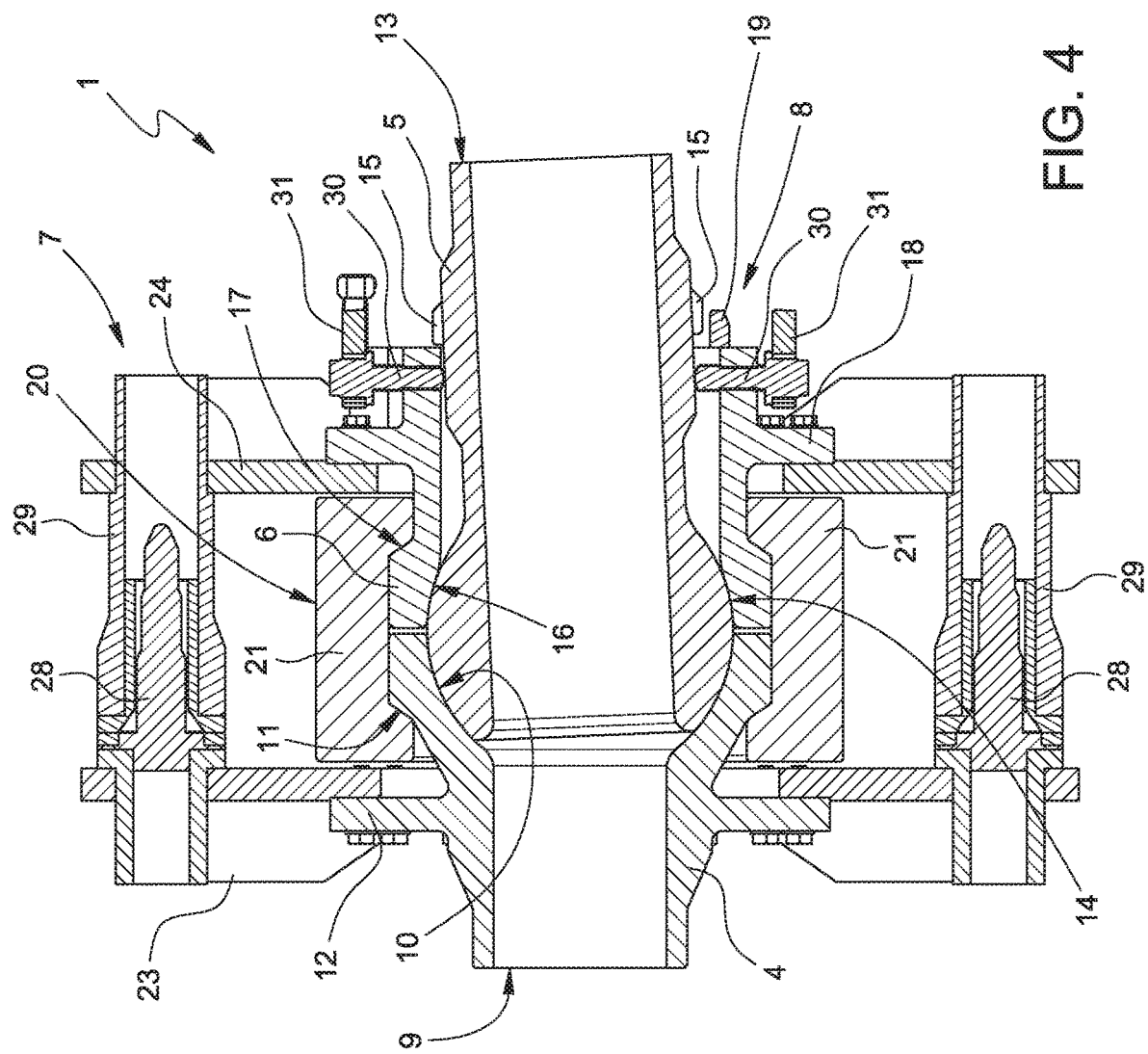

In particular, the tubular bodies 4 and 5 and the tubular pusher 6 are configured to be coupled along the respective spherical faces 10, 14 and 16 and define a spherical coupling, in which the annular protrusion of the tubular body 5 is clamped between the annular protrusions of the tubular body 4 and the tubular pusher 6 as better shown in FIG. 4, wherein the spherical outer face 14 of the tubular body 5 contacts both the spherical inner face 10 of the tubular body 4 and the spherical inner face 16 of the tubular pusher 6.

The inner diameter of the tubular pusher 6 is larger than the outer diameter of the tubular body 5 so as to enable the axis A2 of the tubular body 5 to form angles with respect to the axis A3 of the tubular pusher 6.

The connection device 1 comprises a vice 20 configured to radially and axially clamp the first tubular body 4 and the tubular pusher 6 so as to clamp the second tubular body 5 between the first tubular body 4 and the tubular pusher 6. The vice 20 comprises at least two clamps 21, which are hinged together at first ends and connected to each other at second ends by a screw 22 configured to selectively open and close the clamps 21. Each clamp 21 has a respective inner face 22, which is concave and shaped so as to provide a form fit with the projecting and adjacent portions of the first tubular body 4 and the tubular pusher 6 as better shown in FIG. 4. In particular, the clamps 21 cooperate with the inclined faces 11 and 17 to generate clamping forces having radial and axial components.

With reference to FIG. 1, the mechanism 7 comprises a frame 23 integral with the tubular body 4 and a frame 24 integral with the tubular pusher 6; and actuators 25 connectable to the frames 23 and 24 configured to bring the frames 23 and 24 close together. The frames 23 and 24 have respective seats 26 configured to house the actuators 25 and each actuator 25 is provided with two anchoring members 27 configured to be coupled to the respective seats 26. The frames 23 and 24 comprise respective centering elements 28 and 29, which are configured to penetrate into each other and align the frames 23 and 24, and consequently align the tubular body 4 with the tubular pusher 6. In particular, the centering elements 28 are pins with cylindrical portions connected by truncated conical portions so as to define a protrusion tapered toward the respective free ends thereof, whereas the centering elements 29 are bushings having respective seats coated with an elastomeric material and suitable to house the centering elements 28.

The mechanism 7 supports the vice 20, and in the example shown the frame 24 supports the screw 22 and the vice 20, which is driven by the screw 22.

Figure 3:
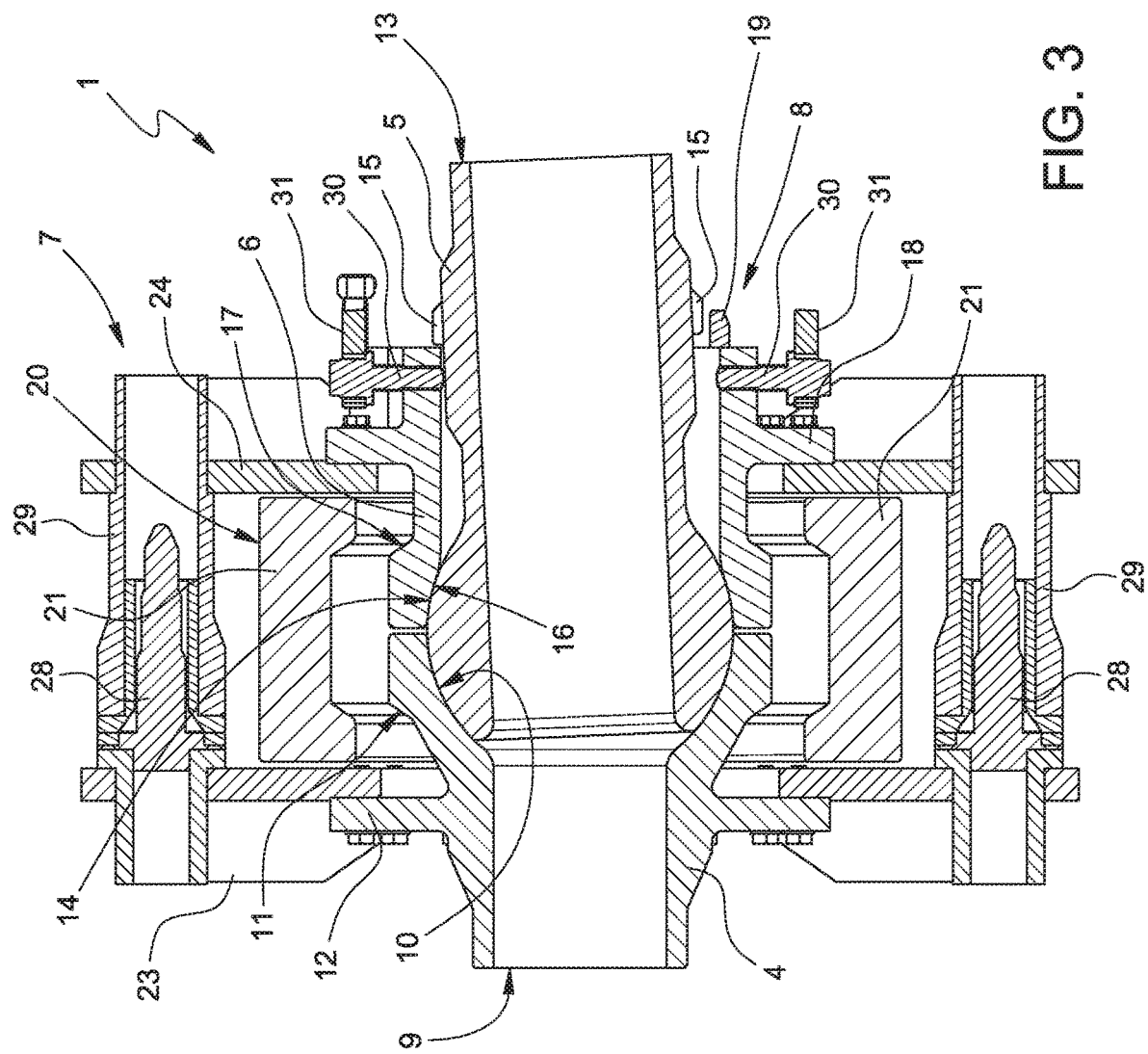

With reference to FIGS. 3 and 4, the mechanism 8 comprises a plurality of spacers 30, which are supported by the tubular pusher 6, are selectively operable between an extended configuration (FIG. 4) and a retracted configuration (FIG. 3), are arranged between the tubular pusher 6 and the tubular body 5, and in the extended configuration block possible movements of the tubular body 5 with respect to the tubular pusher 6, and therefore with respect to the locking device 7. In practice, the mechanism 8 has the function of blocking possible rotations of the tubular body 5 relative to the tubular body 4 at the spherical joint. Since the blocking of the tubular bodies 4 and 5 relative to the tubular pusher 6 is achieved by friction between spherical bodies, any stress could cause rotation of the tubular bodies 4 and 5 relative to each other. The spacers 30 serve the purpose of locking the angular position of the tubular body 5 with respect to the tubular pusher 6 and the frame 24. Each spacer 30 is slidably coupled in a seat of the tubular pusher 6 and is coupled to a respective actuator 31 which causes it to move in a radial direction with respect to the tubular pusher 6.

In use, the connection device 1 shown in FIG. 1 is preliminarily made integral with a section 2 of the pipe and a section 3 of the pipe. In greater detail, the tubular body 4 associated with the respective frame 23 is welded to the section 2 of the pipe, whereas the tubular body 5 associated with the respective frame 24 is welded to the section 3 of the pipe.

Subsequently, the two frames 23 and 24 with the corresponding tubular bodies 4 and 5 are arranged facing each other so as to enable the actuators 25 to be arranged in the seats 26 of the respective frames 23 and 24. When the actuators 25 are powered, they cause the frames 23 and 24 to approach each other, and the progressive insertion of the centering elements 28 in the centering elements 29 (FIGS. 3 and 4) (FIG. 3).

The vice 20 is then closed around the tubular bodies 4 and 5 and the tubular pusher 6 in order to exert radial and axial compression forces through the vice 20. The clamping of the vice 20 determines a univocal position of the frames 23 and 24 and the tubular bodies 4 and 5 with respect to a coordinate system. Once the vice 20 has been clamped the actuators 25 can be removed, while the spacers 30 are arranged in an extended position, with their free end in contact with the outer face of the tubular body 5 to prevent rotation of the tubular body 5 around the spherical coupling with respect to the tubular body 4 and the tubular pusher 6.

The connection device 1 described and shown in the attached Figures is reversible, and following the reverse process to that described above it is possible, if necessary, to disconnect the two pipe sections 2 and 3.

Figure 5:
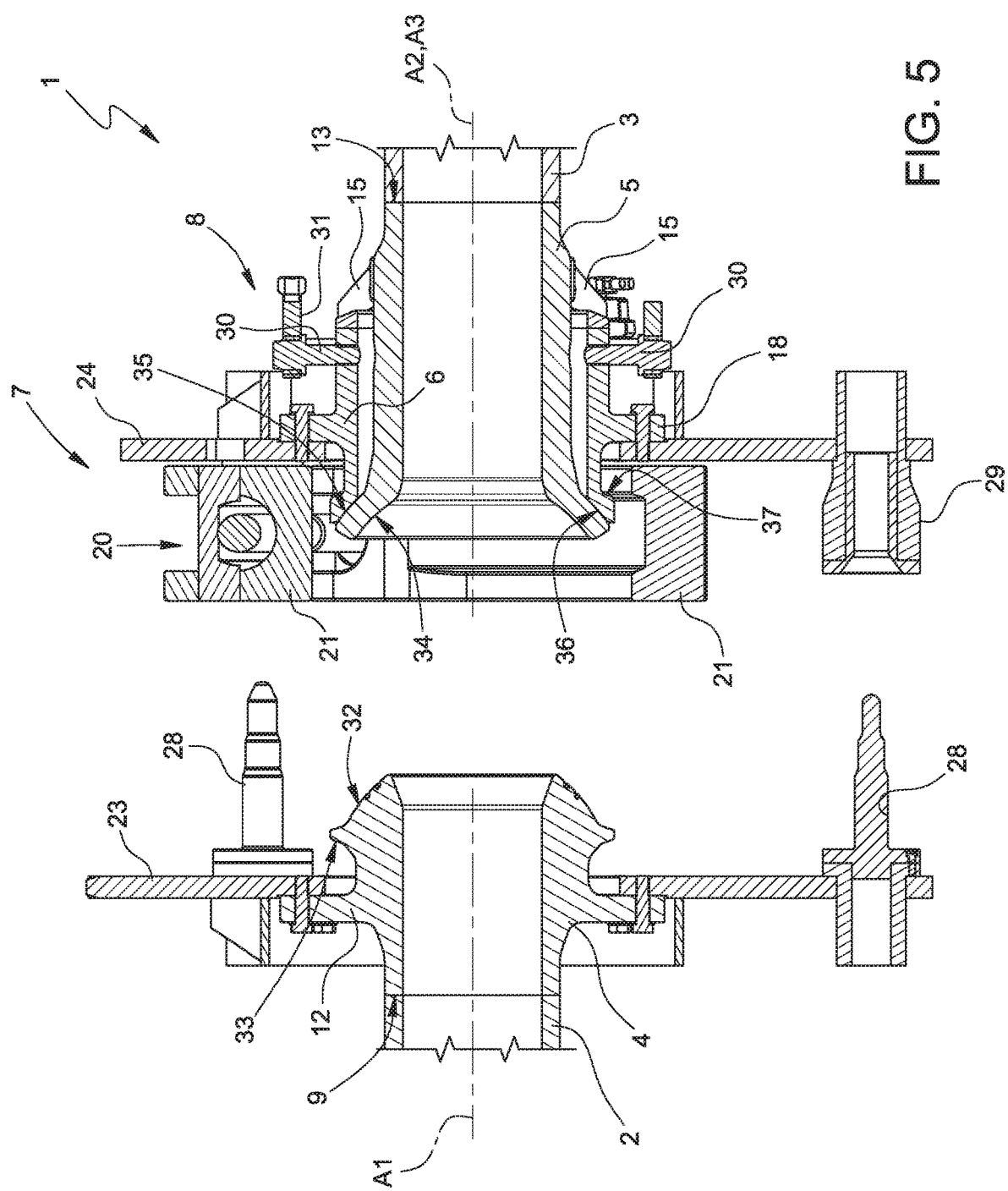
FIG. 5 is a sectional view, with parts removed for clarity, of a variant of the present disclosure.

FIG. 5 shows a variant of the present disclosure, wherein the connection device 1 comprises a tubular body 4 which extends along the axis A1 and comprises one end 9 configured to be jointed, possibly by welding, with the section 2 of the pipe; an annular protrusion at the end opposite the end 9; a spherical outer face 32 at the annular protrusion; an inclined outer face 33 at the annular protrusion; and a flange 12 arranged between the annular protrusion and the end 9 to connect the tubular body 4 to the mechanism 7. The tubular body 5 extends along an axis A2 and comprises one end 13 configured to be connected, possibly by welding, to the section 3 of the pipe; an annular protrusion opposite the end 13; a spherical inner face 34 and a spherical outer face 35 at the annular protrusion; and a plurality of stop members 15 arranged near the end 13. The tubular pusher 6 extends along an axis A3 and comprises an annular protrusion; a spherical inner face 36 at the annular protrusion; an inclined outer face 37; a flange 18 configured to connect the tubular pusher 6 to the mechanism 7. The variant in FIG. 5 shows a different embodiment of the spherical coupling between the first and second tubular bodies 4 and 5 and the pusher 6.

It is clear that the present disclosure includes further variants that are not explicitly described, without however departing from the scope of protection of the following claims. Accordingly, various changes and modifications to the presently disclosed embodiments will be apparent to those skilled in the art.

The invention claimed is:

1. A connection device configured to join two pipe sections, the connection device comprising:
 a first tubular body defining a spherical face;
 a second tubular body defining at least one spherical face;
 a tubular pusher arranged about the second tubular body and defining a spherical face;
 a first mechanism configured to:
  couple the second tubular body between the first tubular body and the tubular pusher, and
  form a spherical coupling between the first tubular body and the second tubular body;
 a second mechanism configured to block a movement, about the spherical coupling, of the second tubular member with respect to the first tubular body and the tubular pusher; and
 a vice configured to radially and axially clamp the first tubular body and the tubular pusher about the second tubular body at the spherical coupling, wherein the vice comprises at least two clamps defining respective inner faces that cooperate with respective annular protrusions of the first tubular body and respective annular protrusions of the tubular pusher configured to transfer radial and axial forces to the first tubular body and to the tubular pusher.

2. The connection device of claim 1, wherein the vice is supported by the first mechanism.

3. The connection device of claim 1, wherein:
 the first tubular body defines a spherical inner face,
 the second tubular body defines a spherical outer face,
 the tubular pusher defines a spherical inner face, and
 the spherical outer face of the second tubular body, the spherical inner face of the first tubular body and the spherical inner face of the tubular pusher are configured to form a spherical coupling between the first tubular body, the second tubular body and the tubular pusher.

4. The connection device of claim 1, wherein:
 the first tubular body defines a spherical outer face,
 the second tubular body defines a spherical inner face and a spherical outer face,
 the tubular pusher defines a spherical inner face, and
 the spherical outer face of the first tubular body, the spherical inner face and the spherical outer face of the second tubular body and the spherical inner face of the tubular pusher are configured to form a spherical coupling between the first tubular body, the second tubular body and the tubular pusher.

5. The connection device of claim 1, wherein:
 the first tubular body defines an annular-shaped inclined outer face,
 the tubular pusher defines an annular-shaped inclined outer face, and the annular-shaped inclined outer face of the first tubular body and the annular-shaped inclined outer face of the tubular pusher are configured to receive forces configured to clamp the spherical coupling.

6. A connection device configured to join two pipe sections, the connection device comprising:
 a first tubular body defining a spherical face;
 a second tubular body defining at least one spherical face;
 a tubular pusher arranged about the second tubular body and defining a spherical face;
 a first mechanism configured to couple the second tubular body between the first tubular body and the tubular pusher, and to form a spherical coupling between the first tubular body and the second tubular body, the first mechanism comprising:
  a first frame integral with the first tubular body, the first frame defining a first seat configured to house an actuator with two anchoring members configured to be selectively inserted in the first seat and removed from the first seat,
  a second frame integral with the tubular pusher, the second frame defining a second seat configured to house an actuator with two anchoring members configured to be selectively inserted in the second seat and removed from the second seat, and
  a plurality of actuators connectable to the first frame and the second frame, the plurality of actuators configured to bring the first frame and the second frame a first distance apart to form the spherical coupling between the first tubular body and second tubular body; and
 a second mechanism configured to block a movement, about the spherical coupling, of the second tubular member with respect to the first tubular body and the tubular pusher.

7. The connection device of claim 6, wherein:
 the first frame comprises a first centering element configured to align the first tubular body with the tubular pusher, and
 the second frame comprises a second centering element configured to align the first tubular body with the tubular pusher.

8. The connection device of claim 6, wherein:
 the first tubular body defines a spherical inner face,
 the second tubular body defines a spherical outer face,
 the tubular pusher defines a spherical inner face, and
 the spherical outer face of the second tubular body, the spherical inner face of the first tubular body and the spherical inner face of the tubular pusher are configured to form a spherical coupling between the first tubular body, the second tubular body and the tubular pusher.

9. The connection device of claim 6, wherein:
 the first tubular body defines a spherical outer face,
 the second tubular body defines a spherical inner face and a spherical outer face,
 the tubular pusher defines a spherical inner face, and
 the spherical outer face of the first tubular body, the spherical inner face and the spherical outer face of the second tubular body and the spherical inner face of the tubular pusher are configured to form a spherical coupling between the first tubular body, the second tubular body and the tubular pusher.

10. The connection device of claim 6, wherein:
the first tubular body defines an annular-shaped inclined outer face,
the tubular pusher defines an annular-shaped inclined outer face, and
the annular-shaped inclined outer face of the first tubular body and the annular-shaped inclined outer face of the tubular pusher are configured to receive forces configured to clamp the spherical coupling.

11. A connection device configured to join two pipe sections, the connection device comprising:
a first tubular body defining a spherical face;
a second tubular body defining at least one spherical face;
a tubular pusher arranged about the second tubular body and defining a spherical face;
a first mechanism configured to:
couple the second tubular body between the first tubular body and the tubular pusher, and
form a spherical coupling between the first tubular body and the second tubular body; and
a second mechanism configured to block a movement, about the spherical coupling, of the second tubular member with respect to the first tubular body and the tubular pusher, wherein the second mechanism is mounted on the tubular pusher and comprises a plurality of spacers arranged between the tubular pusher and the second tubular body, the spacers being selectively operable between an extended configuration and a retracted configuration wherein in the extended configuration, the spacers extend inside the tubular pusher and are configured to block movement of the second tubular body with respect to the tubular pusher.

12. The connection device of claim 11, wherein each spacer is slidably mounted through the tubular pusher and is movable in the radial direction.

13. The connection device of claim 11, further comprising a plurality of additional actuators that are each associated with a respective spacer.

14. The connection device of claim 11, wherein:
the first tubular body defines a spherical inner face,
the second tubular body defines a spherical outer face,
the tubular pusher defines a spherical inner face, and
the spherical outer face of the second tubular body, the spherical inner face of the first tubular body and the spherical inner face of the tubular pusher are configured to form a spherical coupling between the first tubular body, the second tubular body and the tubular pusher.

15. The connection device of claim 11, wherein:
the first tubular body defines a spherical outer face,
the second tubular body defines a spherical inner face and a spherical outer face,
the tubular pusher defines a spherical inner face, and
the spherical outer face of the first tubular body, the spherical inner face and the spherical outer face of the second tubular body and the spherical inner face of the tubular pusher are configured to form a spherical coupling between the first tubular body, the second tubular body and the tubular pusher.

16. The connection device of claim 11, wherein:
the first tubular body defines an annular-shaped inclined outer face,
the tubular pusher defines an annular-shaped inclined outer face, and
the annular-shaped inclined outer face of the first tubular body and the annular-shaped inclined outer face of the tubular pusher are configured to receive forces configured to clamp the spherical coupling.

* * * * *